Oct. 26, 1965  R. M. LANDSMAN ETAL  3,214,574
APPARATUS FOR COUNTING BI-NUCLEATE LYMPHOCYTES IN BLOOD
Original Filed Oct. 8, 1959  5 Sheets-Sheet 1

INVENTORS
ROBERT M. LANDSMAN
LARKIN B. SCOTT
MARCEL J.E. GOLAY
BY

3,214,574
APPARATUS FOR COUNTING BI-NUCLEATE
LYMPHOCYTES IN BLOOD
Robert M. Landsman, Norwalk, Conn., Larkin B. Scott,
Fort Worth, Tex., and Marcel J. E. Golay, Rumson,
N.J., assignors to The Perkin-Elmer Corporation,
Norwalk, Conn., a corporation of New York
Continuation of application Ser. No. 845,254, Oct. 8,
1959. This application July 16, 1952, Ser. No. 211,935
5 Claims. (Cl. 235—92)

This application is a continuance of our co-pending application Serial Number 845,254, filed October 8, 1959, now forfeited.

This invention relates to methods and apparatus for automatically recognizing certain patterns and, more particularly, to a computer capable of counting the number of bi-nucleate lymphocytes in a given blood sample.

The problem of constructing a computer having pattern recognition capabilities independent of pattern size, orientation, etc. is one that has not been solved in many instances. The remarkable powers of a human being to read print and perform similar tasks provided the solubility of the problem but, unfortunately, we lack a full understanding of all the computer circuits that are at play in human processes. However, the advantages that have taken place over the last few years in the computer art, particularly in the digital field, seem to be narrowing the gap between existing machines and machines that truly think.

An article entitled "A Computer Oriented Toward Spatial Problems" by S. H. Unger appearing in the October 1958 issue of Proceeding of the Institute of Radio Engineers at page 1744 shows some examples of basic circuits and the way in which certain programs are carried out to discover properties of a pattern which has been represented by "ones" or "zeros" containing in a matrix of binary storage elements. The general procedure discussed by Unger and other writers is first to perceive and store some representation of the inspected image and then to perform various transformations on the image in a sequence such as to lead to the desired output information.

These transformations are generally of the sort wherein each information bit in the array of data is made subject to a change of state (one to zero or vice versa) depending on various rules set up in respect to the states of other bits throughout the array.

It is, therefore, a primary object of the present invention to provide a method whereby a computer is made to recognize and distinguish patterns.

Other objects are to provide a novel pattern shrinking technique; to provide a method of distinguishing and counting the bi-nucleate lymphocytes present in a blood sample; and to provide apparatus capable of recognizing and distinguishing spatial patterns.

Other objects, features, and advantages will be apparent from the following description, appended claims, and the figures of the attached drawings which are described in detail below.

In accordance with the present invention, a two-dimensional pattern is stored in a field register consisting of a number of bi-stable elements. The stored pattern is not limited to any particular configuration but for purposes of illustration, may be asumed to be the nuclei of a single lymphocyte. By a series of novel programming steps, explained below in greater detail, the stored representation of each nucleus is "shrunk" by continually erasing the periphery of the stored image. The representation of each nucleus is thereby reduced to a single element. The remaining single elements are then counted as an indication of the number of nuclei present in the particular lymphocyte under investigation.

By the present invention, instead of working on data all over the storage field at once, data may be taken up a line at a time. This may result in a loss of speed but provides an important saving in the number of circuit elements required to apply the necessary logic. A further aspect of this invention makes use of complete serial operation wherein data is operated on a bit at a time. At the speeds it is possible to work digital circuit elements today, it is possible to operate on bits at a rate of at least 100,000 per second, whereas the number of bits required to represent adequately a blood cell pattern, for example, is something on the order of 2000. Thus a serially operated device should be able to perform 50 program transformations per second on the entire array, whereas fewer than this would probably be required for a determination on most blood cells.

This invention provides completely serial operation and offers the possibility of performing one blood cell determination per second. The dividend from this relatively lower speed of operation is minimum cost, since the same circuits perform logic operations on each bit in sequence and hence are not required in multiple. In addition to the basic shrink transformation, it is relatively easy to include steps for performing other useful transformations. For instance, with relatively little added complexity it is possible to include program steps which perform the function of cleaning the image information of spottiness such as might be due to noise or other causes not related to true image data. As an example, by proper programming, the machine is made to ignore blood cells which touch the field edge, and yet these steps are carried out by the same circuitry used in other steps.

The method of this invention will be more readily understood by reference to the figures of the drawings which illustrate an embodiment of the invention useful for automatically performing certain lymphocyte determinations.

Figure 1:
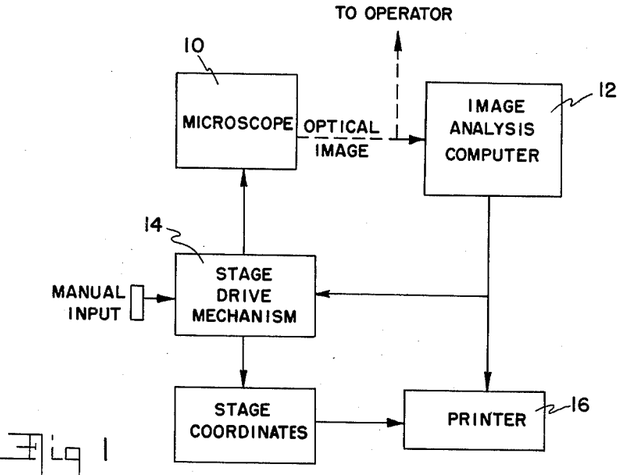
FIG. 1 is a schematic diagram of the overall operating system.

A prepared slide containing the blood sample is placed on the stage of microscope 10 by an operator and adjusted into the starting poistion. Operation of the computer is then begun. Image analysis computer 12 picks up the images of blood cells from the microscope and controls the overall operation of the system. If a white blood cell is in the field of view its nuclei are counted, after which an output from the computer 12 causes the stage drive mechanism 14 to move the slide to the next position. The process is repeated until all areas on the slide have been inspected.

Whenever the count of nuclei indicates the presence of a double nucleus, the printer 16 is actuated recording the position coordinates of the microscope stage at which the double nucleus appeared. At the close of the run an operator may then return to these positions manually for purposes of verifying the count.

Figure 2:
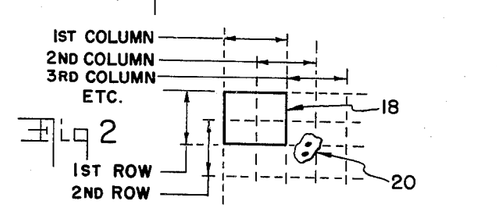
FIG. 2 illustrates the motion of the microscope stage.

FIG. 2 illustrates the movement of the microscope stage. The movement of the stage that is made automatically at the termination of each counting operation is just equal to half the width of the field of view 18 so as to achieve 100% overlap. Furthermore, the width of field 18 is made just greater than twice the diameter of the largest blood cell likely to be encountered. Every blood cell will thus be eventually fully contained in the field of view. This is illustrated in FIG. 2 where lymphocyte 20 would be fully contained in the third column, second row field. It is possible for a given blood cell to be fully contained within one quadrant of the field of view 18 and thus be counted four times. The probability of this occurring is quite low, however, and does not significantly affect the statistical result. Further, if a binucleate lymphocyte is so contained, its coordinates will be printed and the error discovered upon visual verification.

Selective coloring of the white cell nuclei may be utilized in such a manner that any field position not containing the distinctive color information is immediately passed over without any attempt at counting. This minimizes the time required to traverse the entire slide area. Whenever the distinctive selective coloring of a white blood cell is detected, the stage stops in position to scan the cell for the presence of at least one nucleus. The image analysis function of the computer is sensitive only to nuclei rather than to cytoplasm. Thus, for any given position, the nuclei present within a field under investigation may be counted.

The advantage of the mode of operation just described is that it avoids any searching or tracking functions or complex servoing of the microscope stage. It offers further simplification in recording stage coordinates, since this may be performed by counting the stepping impulses which drive the stage back and forth.

Figure 4:
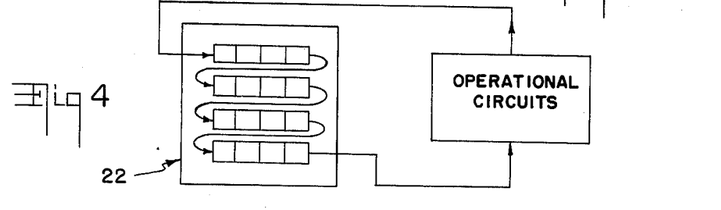
FIG. 4 indicates the sequence of inspection of field register cells.
Figure 5:
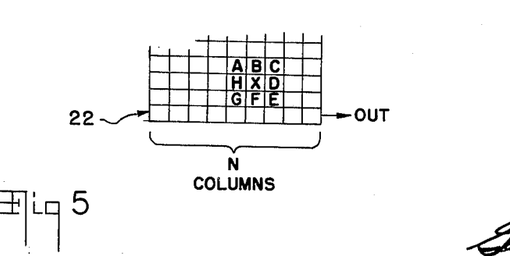
FIG. 5 is a schematic diagram illustrating the spatial relationship of the cells of FIG. 3 to the field register.

The primary input to the computer 12 is an optical image. The region of this image is called the field of recognition. This field is a square which may be considered as divided into $N^2$ resolution elements, there being N rows and N columns of elements. Information in the field image is scanned by an Iconoscope or similar means and the information so obtained may be read into an array of $N^2$ bi-stable storage elements in the form of "ones" or "zeros" depending on whether each resolution element is light or dark according to some pre-set reference. The array of storage elements is illustrated in FIGS. 4 and 5 as Field Register 22. When filled with numbers as described, it possesses a two-tone representation of the optical image.

Figures 6, 7, 8:
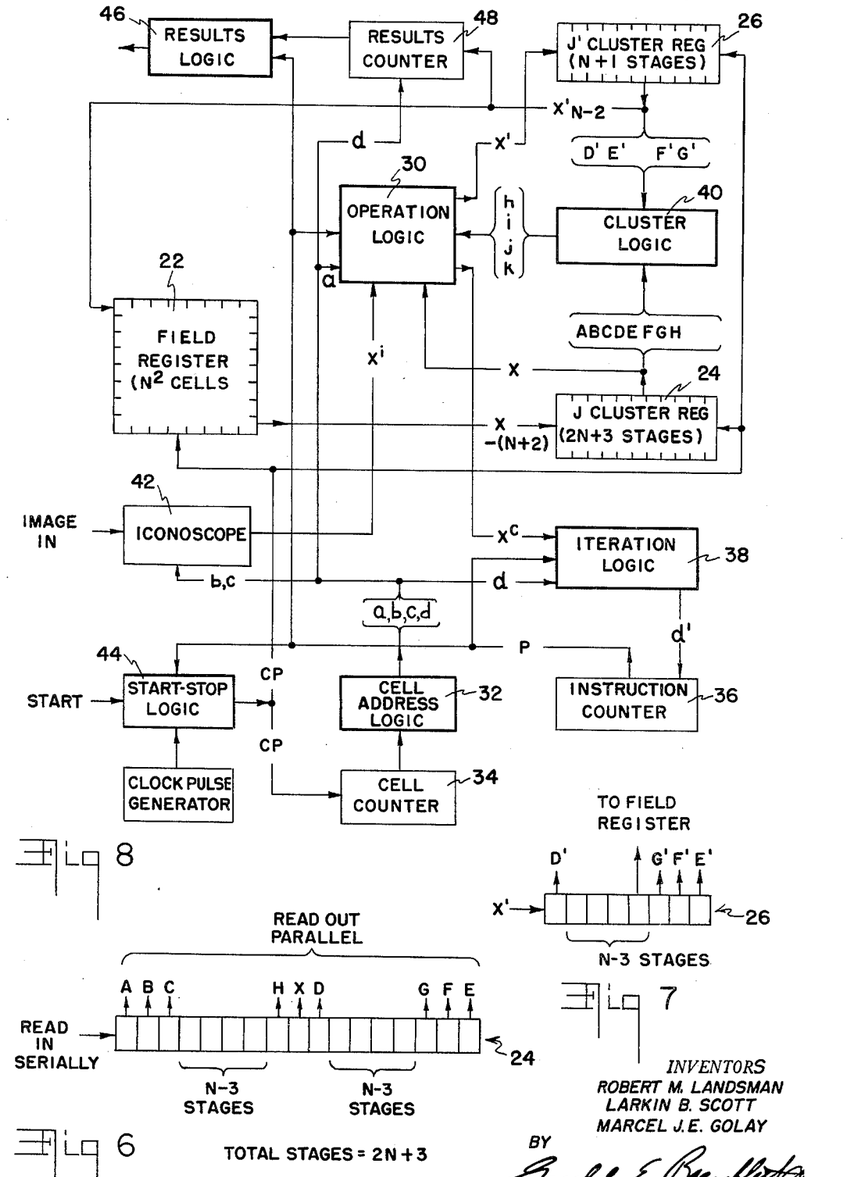
FIGS. 6 and 7 are schematic illustrations of information storage elements.
FIG. 8 is a schematic diagram of a computer usable in the present invention.

The Iconoscope 42 is a standard item which may be similar to that described at page 89 of Fundamentals of Television Engineering by G. M. Glasford, McGraw-Hill (1955). The X and Y deflection voltages are provided by inputs $b$ and $c$. The Iconoscope output is $X^1$.

Each element in Field Register 22 is referred to as a "cell" and the action of the computer is to adjust the numbers stored in each cell based on various rules concerning other neighboring cells, continuing this process until some useful end result is achieved.

The computer being described carries out this operational procedure in serial fashion meaning that each cell is treated individually in sequence. To complete a desired operation on the entire field thus requires at least $N^2$ cell examinations and is referred to as an "operational cycle." Several cycles may be carried out before achieving the desired result.

Figure 3:
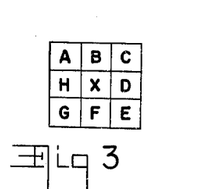
FIG. 3 is a schematic illustration of a section of a field register indicating the inspected cell and the neighboring cells.

For each cell examination the computer recognizes the values stored in the eight cells which surround the one under examination. These nine cells are referred to as a cluster, the cell at the center being called an X cell, and the neighboring cells being known as J cells (the "jury" cells). This is illustrated in FIGURE 3 where the J cell poistions are identified as A through H. Whether an X cell containing a stored "one" ($X=1$) or a stored "zero" ($X=0$) is left in its original state is made dependent on the properties of the binary number composed by J cell contents written in the sequence A thru H.

Because of the serial mode of operation, each cell in the field is successively treated as an X cell. This is performed by shifting out the contents of the cell at what may be considered the lower, right-hand corner of Field Register 22, subjecting it to the influence of certain logic, and returning the modified contents to the upper, left hand corner of the Field Register. In the meantime the contents of all other cells have been shifted right one step with the contents at the right end of one row being moved to the left end of the row below.

In order that all J cells for an X cell be available for inspection at once, some additional storage is required as part of the operational circuits in order to permit the equivalent of a serial to parallel conversion. This necessitates some delay between input and output of the operational circuit and it has been found convenient to make this equal 2N clock pulses where each clock pulse performs one transfer out of the Field Register. The total time thus required to fully circulate the data and complete one operational cycle is the period of $N^2+2N$ clock pulses.

It should be noted that the X cell of a given cluster becomes a J cell in some later cluster. The decisions concerning an X cell may be based on either the treated or untreated state of a previously examined J cell. Note by comparing FIGURES 3 and 4 that J cell positions D, E, F, and G are the only ones that have been on trial previous to the X cell in a given cluster. To identify the use of cell values which are the result of an examination already performed during a given cycle, a prime (') will be affixed to the symbol representing that cell position.

The separation in time between an X cell and its J cell neighbors depends on the dimensions of the field. Note in FIGURE 5 that cell F, for instance, will shift out of Field Register 22 N clock pulses earlier than Cell X. It is possible to tabulate the separation or delay for all J cells with respect to an X cell as done in Table I. The concept of negative delay is employed to denote an event that occurs later (it would take negative delay to bring an event from the future to the present), but this is done simply for convenience of notation and in no way implies practices that are unrealizable.

TABLE I.—J CELL DELAYS

| J cell position: | Delay in clock pulses with respect to X cell |
|---|---|
| A | $-(N+1)$ |
| B | $-N$ |
| C | $-(N-1)$ |
| D | $+1$ |
| E | $+(N+1)$ |
| F | $+N$ |
| G | $+(N-1)$ |
| H | $-1$ |

The circuit function required for delaying the J cell values so that all may be examined simultaneously is that of a conventional serial to parallel conversion. It will be convenient to discuss this as a shift register although no restriction to shift registers, as opposed to delay lines, is implied.

The serial to parallel circuit is illustrated in FIG. 6 as J Cluster Register 24 and the number of its stages depends, as already implied, on the dimensions of the Field Register. Thus the J Cluster Register illustrated contains $2N+3$ stages. The direction of shift is from left to right, all values shifting one stage per clock pulse.

In order to preserve both the treated and untreated values of J cells having positive delay with respect to X, another register is required whose input is X', the value assumed by X as the result of the applied logic. This register is illustrated in FIG. 7 as J' Cluster Register 26 and requires $N+1$ stages in this particular embodiment.

Since it is impossible to make a decision on X until A has been read from the Field Register, there must be a delay of at least $N+1$ clock pulses in passing data out of Field Register 22, through logic, and back into the Field Register. In order that an operation cycle correspond to an integral number of N clock pulses, the total delay outside Field Register 22 is thus made to be 2N. To accomplish this, the X position of J Cluster Register 24 is fed through Operation Logic Circuit 30, converted to X' and fed to J' Cluster Register 26, and the signal to the Field Register is derived from the stage just preceding the G' stage in J' Cluster Register 26.

The block diagram of the computer is shown in FIGURE 8. The subscript on the symbol X refers to the delay of that cell value with respect to X in J Cluster Register 24 whose delay is considered to be zero. Thus the output of Field Register 22 is $X_{-(N+2)}$, meaning that that cell value is to be tested $N+2$ clock pulses later on, whereas the input is $X'_{N-2}$, meaning that that cell value underwent its test $N-2$ clock pulses ago.

Each of Field Register 22, J Cluster Register 24, and J' Cluster Register 26 is a standard shift register such as illustrated at page 22 of Symbolic Logic, Boolean Algebra and the Design of Digital Systems by the Technical Staff of Computer Control Company, Inc. (1959), and each is driven by shift pulse CP.

For ease of description the logic circuits are divided into various categories relating to their basic purpose in the computer. The key circuits are Cluster Logic 40 which generates certain decisions based on J and J' values, and Operation Logic 30 which makes decisions on X based on Cluster Logic decisions and other inputs. There are several other minor logic circuits whose purposes have more to do with controlling progress of the computer operation. All of these circuits are considered in greater detail later.

As already stated, the key feature of the program logic is the "shrink" order. A good basis for carrying out this order is to make $X=1$ become $X=0$ if there are as many as three adjacent J cells possessing the value "zero." Applying this rule repeatedly to a pattern of "ones" causes the "fringe ones" to vanish and hence the pattern shrinks. It is soon discovered, however, that applying this rule alone permits an undesirable occurrence for it may permit a "one" to vanish which is the last remaining to join two larger populations of "ones" on either side of it. Such an occurrence is of special significance in the blood cell scanner problem due to the fact that bridge-connected nuclei are to be taken as a single no matter how small the bridge joining the two nuclei.

If an $X=1$ cell is the residual connection between two areas, it is called a "link" cell. It has been discovered that a link cell can be identified by the condition of unlike adjacent J cells occurring more than twice in the cluster. There are always an even number of occurrences. The discovery of this condition for an X cell may thus be used to prevent the "link ones" from vanishing when such is not desired.

Application of these two rules repeatedly will make all $X=1$ vanish ultimately. To preserve the last remaining $X=1$ in an original glob, it suffices to look for the condition where the J' cells (those having already received convictions as X cells) and the J cells awaiting trial as X cells are all zero. This condition is used to preserve the "lone ones" when desired. These three rules appear to be sufficient for controlling the shrinking process. A fourth rule, that of detecting the presence of any $J=1$ cell, has been found useful for carrying out certain other program steps. These four rules are exercised by the behavior of Cluster Logic Circuit 40 as defined more carefully later on. The circuits required to generate this logic are neither unusual nor complex. For instance, the detection of more than two occurrences of unlike adjacent J cells may be achieved by converting the 8-digit J cell number to its Gray code equivalent and totaling the number of "ones" present.

The remainder of the logic operations which may be performed will become apparent by studying the following descriptions of the various circuit blocks, the meanings of orders, and the tabulation of program steps.

In the preparation of a program for the computer, it is convenient first to tabulate all of the "orders" that will be executed at one time or another during the progress of the analysis operation. Each order specifies some distinct form of action to be taken in relation to the problem data, and the program consists of a sequence of these orders. The program is divided into steps, and a given program step may invoke two or more orders which are to be carried out simultaneously. It will be obvious that orders so combined must not be mutually conflicting.

The names of orders and their meanings which have so far been visualized for the computer under description are given in Table II. Note that the SC and SR meanings are examples of conflicting orders whereas the SC and IN meanings are not.

TABLE II.—ORDER MEANINGS

| Order | Abrev. | Meaning |
|---|---|---|
| Read Edge | RE | Image scanned with sensitivity to cytoplasm and nuclei. Only those image elements occurring in edge rows or columns are read into Field Register as "ones." |
| Read Grow | RG | Image scanned with sensitivity to cytoplasm and nuclei. Image elements adjacent to any stored "ones," as well as previously stored "ones," are read into Field Register as "ones." |
| Read Holes | RH | Image scanned with sensitivity only to nuclei. Image elements not previously stored are read into Field Register. |
| Shrink Complete | SC | Cycle the field wiping out "fringe ones" or "lone ones," but preserve "link ones." |
| Shrink Restricted | SR | Cycle the field wiping out "fringe ones," but preserving any "link ones" or "lone ones." |
| Invert | IN | Complement output of Field Register. |
| Cycle Repeat, Conditional. | $CR_c$ | Repeat this cycle until order being exercised produces no further change. |
| Cycle Repeat, Programmed. | $CR_n$ | Repeat this cylce n times. |
| Print Shift | PS | Stop cycling, print output, and shift to next field position. |

The program may now be written in terms of the orders just described. The program steps are designated $P_1$, $P_2$, etc. The subscripts refer to sequence except for certain instances where a program step may be repeated under the influence of a repeat (CR) order. While it has not been provided for in the presently described program, it is also possible to include "jump" orders for causing particular program steps to be skipped under certain conditions. The purpose of such orders would be to save time or to enter some new avenue of problem solution.

Table III presents an exemplary program for a blood cell scanning problem:

TABLE III

| Program Step | Order | Remarks |
|---|---|---|
| 1 | RE | |
| 2 | RG, $CR_c$ | |
| 3 | RH | Field Register contains nuclei of cells not occulted by edge of field. |
| 4 | SC, $CR_2$ | |
| 5 | SC, IN | |
| 6 | SC, $CR_2$ | |
| 7 | SC, IN | Field is filtered of noise. |
| 8 | SR, $CR_c$ | Field shrinks to one bit per nucleus. |
| 9 | PS | Output prints coordinates if double nucleus remains. |

The first three program steps read the input information into the Field Register excluding those portions not fully contained by the field boundaries. The fourth step repeats for a few cycles shrinking away any small spots scattered in the field which are assumed uninteresting. Then by inverting (reversing each cell value) and shrinking, as in the fifth and sixth steps, small holes in the interesting large pattern elements became spots which again may be made to vanish by a few shrink cycles. The field is then inverted again and the shrink operation continued until no further change occurs whereupon the remaining $X=1$ values may be counted and results evaluated.

The invert and shrink operations accomplished in program steps 5 and 6 remove vacant spots in the globs to be counted. This is important for the shrink rules so far adopted would not reduce a doughnut shaped pattern to a single "lone one." The holes are not opened up very much during the previous step 4 whereas on inversion the spots representing these holes vanish quickly, usually within a few operational cycles. This effect is due to the nature of the shrink rules which fit more of the J cell conditions found for an X cell along a convex edge than for an X cell along a concave edge.

A machine applicable to the purposes herein described need not necessarily utilize equipment having variable programming capabilities but for reasons of economy might fall into the class of special purpose computers having programs permanently "wired in." This would affect the layout of circuits, and it will be seen on studying the following descriptions of circuits and the block diagram of FIG. 8, that only the Cell Address Logic 32 and Cluster Logic 40 circuits have behaviors that are independent of program steps.

In the following description, certain circuit functions are described simple in terms of logic equations. The notation is that of Richards (R. K. Richards, Arithmetic Operations in Digital Computers, Van Nostrand, 1955) and others, and the meanings of such expressions are more clearly illustrated in the later description of logic diagrams.

The cell counter 34 consists essentially of two counters: one for columns, and one for rows. There are N columns and N rows in Field Register 22, and two additional rows of N positions each in the path through the operational registers (the J and J' Cluster Registers 24 and 26). Thus the column counter has N states and the row counter has $N+2$ states. The column counter is driven by clock pulses during an operational cycle, whereas the row counter is driven by the column counter. Both of these counters are standard binary counters of the type disclosed in Digital Computer Components and Circuits by R. K. Richards, Van Nostrand (1957) at page 177.

The Cell Address Logic circuit 32 receives inputs from the Cell Counter 34 and creates various outputs based on the address of X cells appearing during the operational cycle. The address refers to the position an X cell occupies when restored to the Field Register at the conclusion of a cycle. These outputs are as follows.

Output designation:             Description $a$ _____ $a=1$ when X is from row 1 or N or from column 1 or N (i.e. when it is from a position at the edge of the field); $a=0$ otherwise.

$b$ _____ $b$=voltage proportional to column number of X (this is horizontal sweep for vidicon).

$c$ _____ $c$=voltage proportional to row number of X (this is vertical sweep for indicator).

$d$ _____ $d=1$ when column and row of $X'_{N-2}=0$; $d=0$ otherwise.

Figure 13:
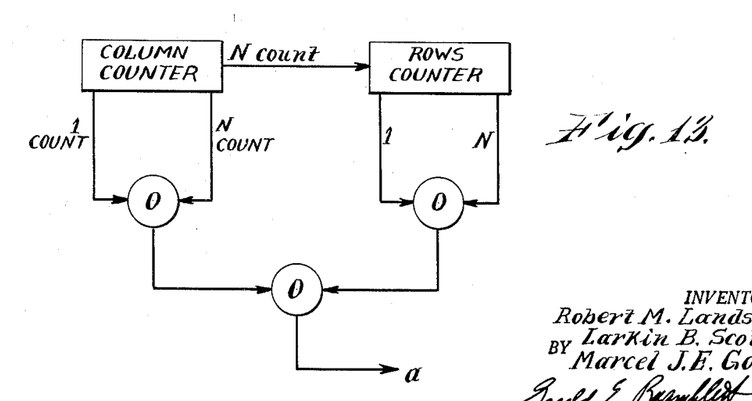

The logic diagrams for producing the above outputs will be completely obvious to those skilled in the art. As an example, the diagram for producing "$a$" is given in FIG. 13.

The Instruction Counter 36 possesses only a few states, the number depending on the nature of the program. For the program herein proposed, 9 states are required. The Instruction Counter is driven by the output of Iteration Logic Circuit 38 and advances one count when the field has been scanned unless inhibited by a cycle repeat (CR) order. Its outputs are designated $P_1$, $P_2$, etc. where the subscript indicates the program step number. This is a standard four stage binary counter of the type disclosed in Digital Computer Components and Circuits by R. K. Richards, Van Nostrand (1957) at page 177.

The Cluster Logic Circuit 40 receives inputs from the J and J' cluster registers 24 and 26 and generates outputs depending on certain combinations of inputs. These inputs are—

Output designation:             Description $i$ _____ $i=1$ if any J cell$=1$ (i.e. if $A+B+C+D+E+F+G+H=1$); $i=0$ otherwise.

$j$ _____ $j=1$ if there are more than two conditions of unlike adjacent J cells. (e.g. unlike adjacent cells exist if $A=B, D=E, H=A$, etc.); $j=0$ otherwise.

$k$ _____ $k=1$ if $(\overline{A+B+C})+(\overline{B+C+D})+$, etc. $=1$ (i.e. if at least 3 adjacent J cells$=0$); $k=0$ otherwise.

$h$ _____ $h=1$ if $A=B=C=D'=E'=F'=G'=H=0$ (i.e. if results of present cycle have reduced J and J' cells to zero); $h=0$ otherwise.

The Operation Logic Circuit 30 receives data from the Cluster Logic —Circuit 40, the J Cluster Register 24, the Iconoscope 42, the Cell Address Logic Circuit 32, and the Instruction Counter 36. It has two outputs which are governed by these inputs as shown by the following logic equations.

Output designation:             Description $X'$ _____ $X'=X^{\mathrm{i}}(P_1a+P_2{}^{\mathrm{i}}+P_3\overline{X})+\overline{a}(P_4+P_6)X(j+\overline{k})+\overline{a}(P_5+P_7)(\overline{X}+\overline{jk})+aP_8X(j+k+h)$.

$X^{\mathrm{c}}$ _____ $X^{\mathrm{c}}=\overline{X}X'+X\overline{X'}$.

The Iteration Logic Circuit 38 receives data from the Cell Address Logic Circuit 32, Operation Logic Circuit 30, and Instruction Counter 36. It possesses a "toggle" circuit whose state is re-set to zero at the beginning of each cycle and which changes to the "one" state if a one occurs at its input any time during an operational cycle.

The output of the Iteration Logic Circuit 38 is as follows.

Output designation:             Description $d'$ _____________________________ $d'=dX_*{}^{\mathrm{c}}(P_2P_8)$ where $X_*{}^{\mathrm{c}}=1$ if any $X^{\mathrm{c}}=1$.

The Start-Stop Logic circuit 44 interrupts clock pulses to the remainder of the computer when the last program step is reached. It is reset on reception of a start pulse permitting return to the first program step. The Clock Pulse Generator and Start-Stop Logic Circuit 44 are standard circuit packages such as are available from commercial computer clock vendors, for example, the 300F clock manufactured by the Navigation Computer Corp., Norristown, Pennsylvania.

Figure 12:
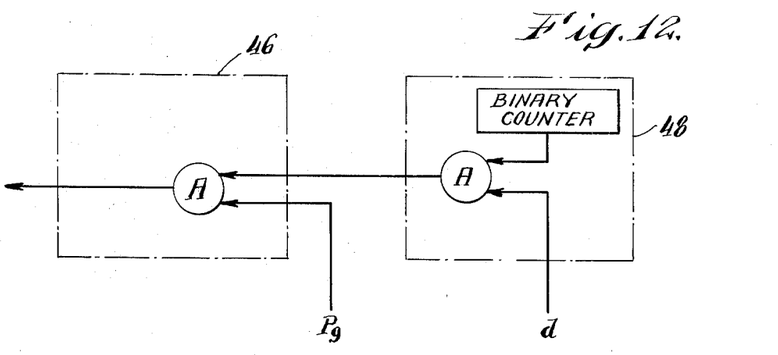

The Results Logic circuit 46 (FIG. 12) provides an output signal at the final program step if a count of two is possessed by the results counter 48. The latter is re-set each cycle. The results counter 48 utilizes a two-stage binary counter of standard design, as disclosed in Digital Computer Components and Circuits by R. K. Richards, Van Nostrand (1957), at page 177.

Figure 10:
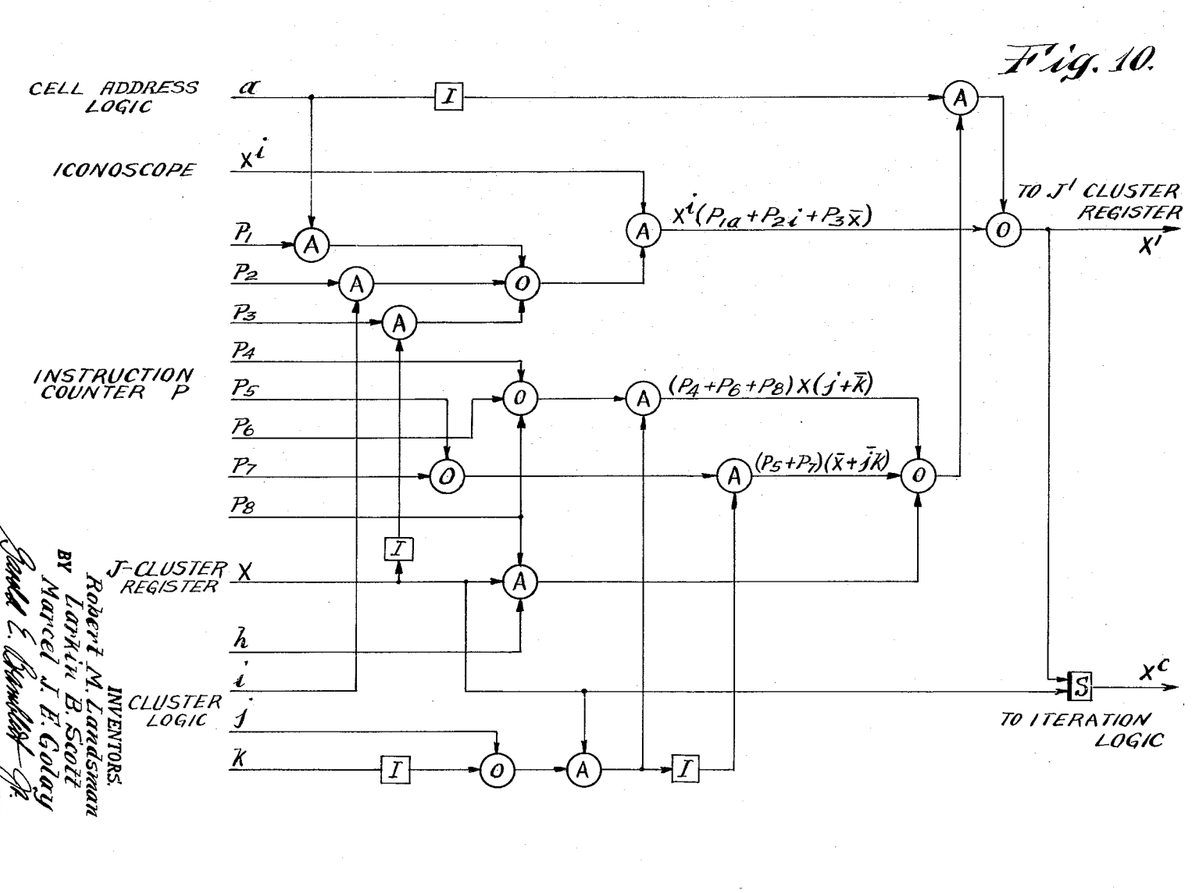
FIGS. 10–13 are illustrations of other logic diagrams usable with this invention.
Figure 11:
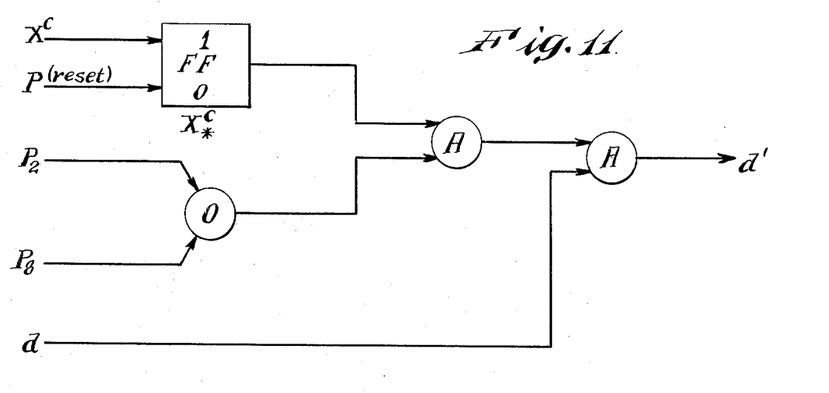

Detailed circuit design is well within the skill of those in the computer art. As an example of such design, a "logic diagram" for the Cluster Logic circuit is presented in FIG. 9 and a similar diagram for the Operation Logic circuit is given in FIG. 10. A logic diagram for the Iteration Logic circuit 38 is given in FIG. 11; for the Results Counter 48 and the Results Logic circuit 46 in FIG. 12; and for Cell Counter 34 and Cell Address Logic circuit 32 in FIG. 13. A logic diagram is in itself little more than a block diagram since it does not specify circuit hardware such as transistors and cores, hence much is left in the way of circuit design. On the other hand, it is becoming increasingly possible to purchase standard components which perform the basic logic functions spelled out in a logic diagram, and a computer might be built around such components, whereupon circuit design effort would be minimized.

These basic logic functions are explained in Table IV. The "Exclusive OR" function is not truthfully a basic building block in that it may be subdivided into a combination of the other three. However, the use of this combination is sufficiently prevalent to warrant its being treated as an elemental function.

TABLE IV.—LOGIC DIAGRAM SYMBOLS

| Circuit Name | Symbol | Equation | Meaning |
|---|---|---|---|
| "AND" |  | C=AB (C=A and B) | Output C is "one" only if both A *and* B are "one." |
| "OR" |  | C=A+B (C=A or B) | Output C is "one" if either A *or* B (or both) are "one." |
| "NOT" |  | C=Ā (C=not A) | Output C is the *inverse* of A. (A=1, C=0; or A=0, C=1). |
| "Exclusive OR". |  | C=AB̄+BĀ (C=A and not B or B and not A) | Output C is "one" if either A or B, but not both, are "one" (C is the binary *sum* of A and B). |

Figure 9:
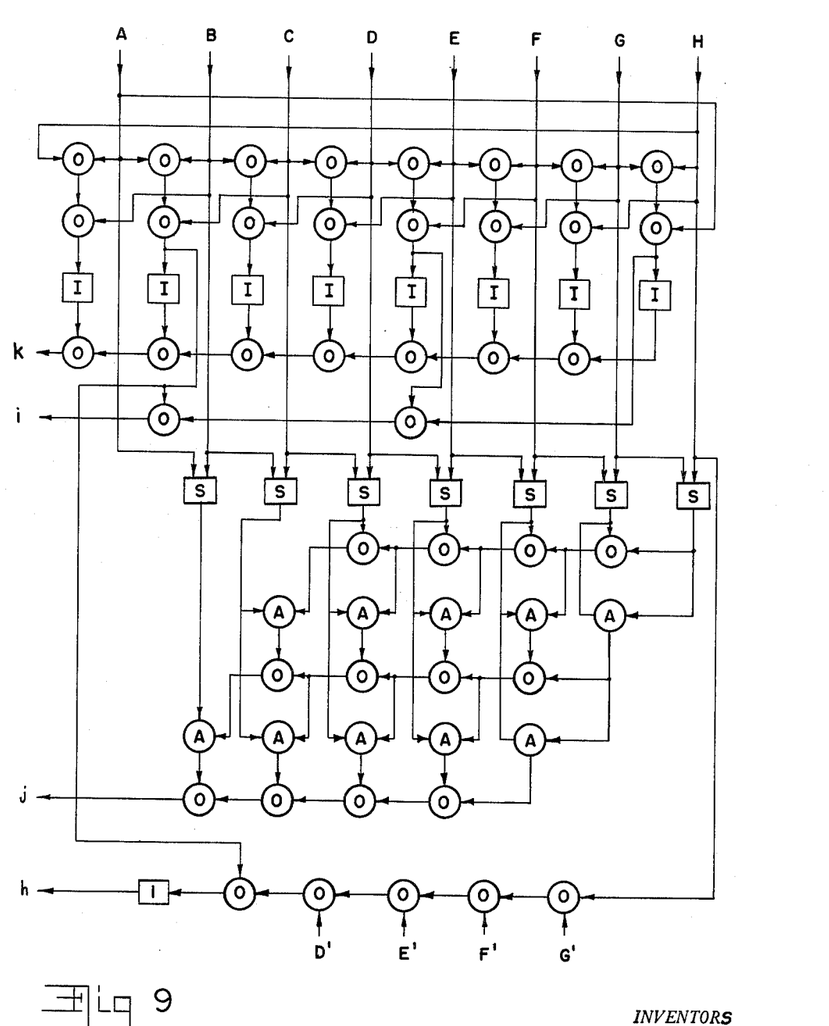
FIG. 9 is an illustration of a logic diagram usable in the method of the present invention.

No attempt has been made to reduce the arrangement of FIG. 9 to a simpler form. The present form of this diagram results from a relatively straight-forward interpretation of the logic equations previously stated. For instance the k signal occurs if any of the inverters (the "NOT" functions) has zero input. For any inverter input to be zero, the three J cell values to which it is connected by "OR" functions must all be zero.

The i signal derivation is rather obvious, it being only necessary to join all J inputs by "OR" functions. By taking advantage of "OR" combinations already included for the k signal, some savings are achieved.

The j signal is formed by first creating signals for all unilke adjacent J values. This uses the "Exclusive OR" function. Since the unlike adjacent values occur in pairs, and since the condition sought is merely the occurrence of more than two, it becomes possible to ignore the relationship between A and H which results in some simplification. Outputs of the "Exclusive OR" functions are fed to a combination of "AND" and "OR" functions which responds if any three or more of its inputs are energized.

The h signal is created by an inverter when all of its inputs are zero. These inputs are the J and J' values specified for the "lone One" condition.

While the description of the present invention has been primarily directed to a method for making blood cell determinations, the invention is not so limited. The method and apparatus of this invention have broad application to the automatic recognition of spatial configurations.

It is to be understood that the structure of the field register as disclosed herein is illustrative only. Any of the well-known types of information storage devices are usable. For example, magnetic tape may be employed. In such a case, although pattern storage would not be in "rows and columns," the tape storage would correspond to a rectangular field register and no change in the program would be required.

We claim:
1. Apparatus for distinguishing spatial configurations which comprises an array of bi-stable storage elements corresponding to a field register of bi-stable storage elements arranged in perpendicular rows and columns;
  means for storing in said array a pattern corresponding to a two-dimensional pattern represented in said field register;
  means for serially inspecting said bi-stable elements in an order corresponding to orderly progression through each successive row of said field register; and
  means for fixing the state of each inspected element in accordance with the states of the storage elements corresponding to field register elements adjacent the field register element corresponding to said inspected element.

2. Apparatus for distinguishing spatial configurations which comprises an array of bi-stable storage elements corresponding to a field register of bi-stable elements arranged in perpendicular rows and columns;
  means for storing in said array a pattern corresponding to a two-dimensional pattern represented in said field register;
  means for serially inspecting said bi-stable elements in an order corresponding to orderly progression through each successive row of said field register;
  means for changing the state of each inspected element corresponding to a pattern element of said field register whenever three storage elements corresponding to field register elements adjacent the field register element corresponding to said inspected element have an off-pattern state; and
  means for continuously repeating the sequence to effectively shrink the stored pattern representation.

3. Blood cell scanner apparatus which comprises microscope means for forming an enlarged optical image of blood sample;
  scanning means positioned in scanning relationship to said enlarged image;
  means for storing the scanned pattern in a field register of bi-stable elements;
  means for reducing the stored pattern to unit bits; and
  means for counting said unit bits to detect the presence of bi-nucleate lymphocytes.

4. Apparatus for distinguishing spatial configurations which comprises an array of bi-stable storage elements corresponding to a field register of bi-stable elements arranged in perpendicular rows and columns; means for storing in said array a pattern corresponding to a two-dimensional pattern represented in said field register; means for inspecting said bi-stable elements; means for changing the state of each inspected element corresponding to a pattern element of said field register whenever at least one storage element corresponding to field register elements adjacent the field register elements corresponding to said inspected element have an off-pattern state; and means for continuously repeating the sequence to effectively shrink the stored pattern.

5. Apparatus for distinguishing spatial configurations which comprises an array of bi-stable storage elements corresponding to a field register of bi-stable elements arranged in perpendicular rows and columns; means for storing in said array a pattern corresponding to a two-dimensional pattern represented in said field register;

means for serially inspecting said bi-stable elements in an order corresponding to orderly progression through each successive row of said field register; means for changing the state of each inspected element corresponding to a pattern element of said field register whenever at least one storage element corresponding to field register elements adjacent the field register element corresponding to said inspected element have an off-pattern state; and means for continuously repeating the sequence to effectively shrink the stored pattern.

References Cited by the Examiner

UNITED STATES PATENTS

| 2,791,377 | 5/57 | Dell et al. | 235—92 |
| 2,889,535 | 6/59 | Rochester et al. | 340—146.3 |
| 2,891,722 | 6/59 | Nuttall et al. | 235—92 |
| 2,948,469 | 8/60 | Phillips et al. | 235—92 |
| 3,069,079 | 12/62 | Steinbuch et al. | 235—61.11 |

MALCOLM A. MORRISON, *Primary Examiner.*